UNITED STATES PATENT OFFICE.

ULRICH GANZ, OF NORDHAUSEN, GERMANY, ASSIGNOR TO ALBERT KAHN, OF HELMSTEDT, AND MARTIN HEBERLEIN, OF EISENACH, GERMANY.

MANUFACTURE OF ARTIFICIAL FUEL.

SPECIFICATION forming part of Letters Patent No. 686,049, dated November 5, 1901.

Application filed March 15, 1901. Serial No. 51,358. (No specimens.)

*To all whom it may concern:*

Be it known that I, ULRICH GANZ, gentleman, a subject of the King of Prussia, Emperor of Germany, residing at Nordhausen, in the Kingdom of Prussia and German Empire, have invented certain new and useful Improvements in the Manufacture of Artificial Fuel, of which the following is a specification.

My invention relates to the manufacture of artificial fuel.

The invention consists in mixing ground raw gypsum with a combustible material, such as peat or like substance of vegetable origin, whereby an excellent substitute for coal is obtained.

I take about eighty per cent. of ground gypsum and incorporate therein twenty per cent. of peat or a like vegetable substance. The mixture is then formed in bodies of suitable size and shape.

Having now particularly described my invention, what I claim as new, and desire to secure by Letters Patent, is—

As a new article of manufacture, artificial fuel consisting of eighty per cent. of ground gypsum and twenty per cent. of peat or its equivalent.

In testimony whereof I have hereunto set my hand in presence of two subscribing witnesses.

ULRICH GANZ.

Witnesses:
 WOLDEMAR HAUPT,
 HENRY HASPER.